US011954931B1

(12) United States Patent
Kanagasabai et al.

(10) Patent No.: US 11,954,931 B1
(45) Date of Patent: Apr. 9, 2024

(54) METHODS AND SYSTEMS FOR DETECTING TAMPERING OF AN IR SECURITY MARK

(71) Applicant: XEROX CORPORATION, Norwalk, CT (US)

(72) Inventors: Rajasekar Kanagasabai, Chennai (IN); Haripriya Chandran, Kulathur Chal (IN); Vignesh Doss, Palanichettipatti (IN); Sainarayanan Gopalakrishnan, Chennai (IN)

(73) Assignee: Xerox Corporation, Norwalk, CT (US)

( * ) Notice: Subject to any disclaimer, the term of this patent is extended or adjusted under 35 U.S.C. 154(b) by 33 days.

(21) Appl. No.: 17/937,794

(22) Filed: Oct. 4, 2022

(51) Int. Cl.
*G06K 9/00* (2022.01)
*G06V 10/28* (2022.01)
*G06V 20/00* (2022.01)
*G06V 30/413* (2022.01)
*G06V 30/414* (2022.01)
*G06V 30/418* (2022.01)

(52) U.S. Cl.
CPC ............ *G06V 30/413* (2022.01); *G06V 10/28* (2022.01); *G06V 20/95* (2022.01); *G06V 30/414* (2022.01); *G06V 30/418* (2022.01); *G06V 2201/13* (2022.01)

(58) Field of Classification Search
None
See application file for complete search history.

(56) References Cited

U.S. PATENT DOCUMENTS

| 8,962,065 | B2 * | 2/2015 | Dalal | B42D 25/29 427/7 |
| 2003/0169456 | A1 * | 9/2003 | Suzaki | G06T 1/0028 382/190 |
| 2010/0259777 | A1 * | 10/2010 | Suzuki | G06V 30/1448 358/1.11 |
| 2012/0251715 | A1 * | 10/2012 | Dalal | B42D 25/21 427/256 |
| 2017/0039421 | A1 * | 2/2017 | Eschbach | G06V 30/418 |
| 2023/0030524 | A1 * | 2/2023 | Gopalakrishnan | H04N 1/00331 |

FOREIGN PATENT DOCUMENTS

WO 2018224108 A1 12/2018

OTHER PUBLICATIONS

US application filed Aug. 20, 2021, U.S. Appl. No. 17/391,253.

\* cited by examiner

*Primary Examiner* — Avinash Yentrapati

(57) ABSTRACT

The present disclosure discloses methods and systems for detecting tampering of an infrared (IR) security mark in a document. The method includes receiving the document including the IR security mark, wherein the IR security mark further includes one or more security texts and/or images. The document is scanned to generate scanned data. A portion of the scanned data including the IR security mark is segmented into a plurality of blocks such as blocks of size 32*32. Thereafter, a ratio of white to black pixels is calculated for each block. The calculated ratio is compared with a known threshold for each block. Upon comparison, the IR security mark is detected as a tampered security mark.

20 Claims, 12 Drawing Sheets

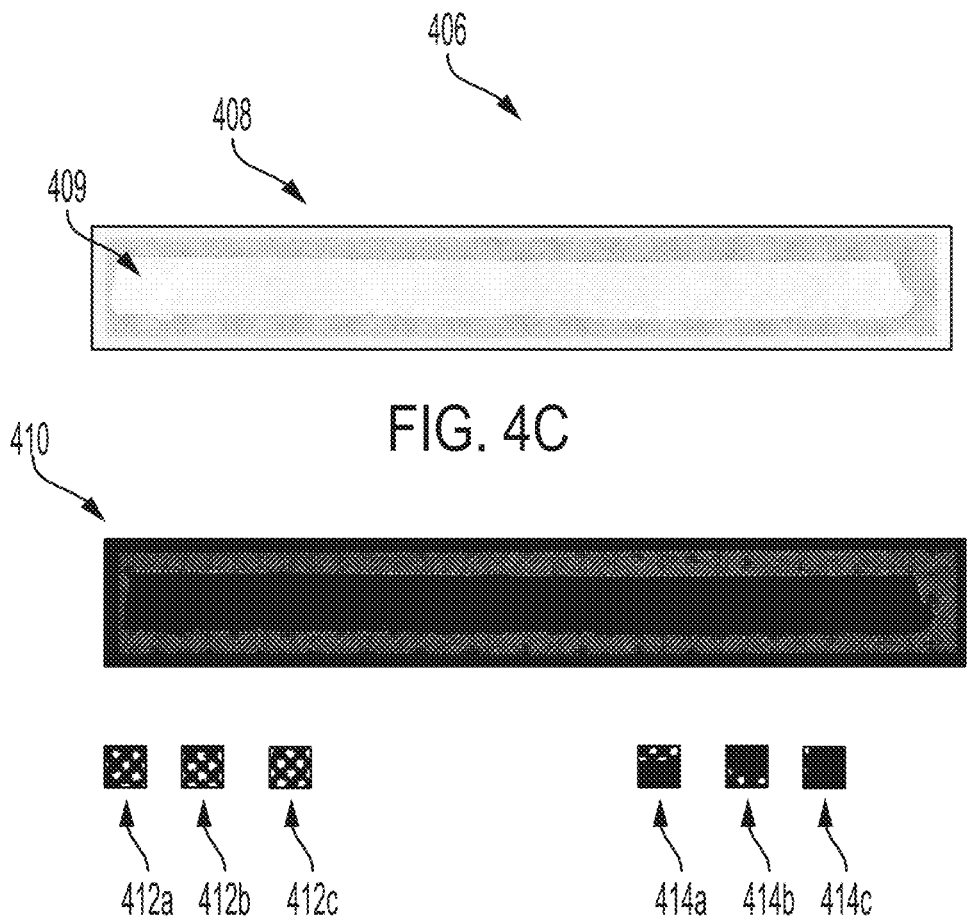

METHODS AND SYSTEMS FOR DETECTING TAMPERING OF AN IR SECURITY MARK

TECHNICAL FIELD

The present disclosure relates to the field of document security. More specifically, the disclosure relates to methods and systems for detecting tampering of an IR security mark in documents.

BACKGROUND

In our day-to-day life, we deal with different confidential documents such as legal documents, bank bonds, research documents, contract documents, prescriptions, coupons, tickets, invoices, and the like. To prevent these confidential documents from any malicious activity, e.g., counterfeiting, forging, etc., organizations employ various security techniques including use of watermarks, barcodes, QR codes, and the like. One such popular technique for protecting documents includes use of IR security marks that offers enhanced security, as it is invisible through naked eyes, and it is very difficult to duplicate.

To identify the genuineness of the documents including the IR security marks, the IR security marks are analyzed and security texts/images embedded in them are extracted and recognized. For example, if the security text/image is recognized, the document is identified as genuine, else the document may be considered non-genuine. But there can be scenarios where the IR security mark is tampered due to multiple reasons such as crumpling of a portion of the document including the IR security mark, use of a pen or marker over a portion including the IR security mark, and so on. In such scenarios, it becomes difficult to identify the IR security mark or text/image embedded in it, even if the IR security mark is present and the document can be falsely identified as non-genuine or non-confidential. This can be problematic for individuals/organizations, especially when tampering of the IR security mark occurs unintentionally or by mistake. In simple words, because of intentional or unintentional tampering of the IR security mark, detection of the security mark can fail and the document can be classified as non-confidential. Thus, there is a need for methods and systems for handling such situations.

SUMMARY

According to aspects illustrated herein, a method for detecting a tampered infrared (IR) security mark in documents is disclosed. The method includes receiving a document including the IR security mark, wherein the IR security mark further includes one or more security texts and/or images. The document is scanned to generate scanned data. A portion of the scanned data including the IR security mark is segmented into a plurality of blocks such as blocks of size 32*32. Then, a ratio of white to black pixels is calculated for each block. The calculated ratio is compared with a known threshold for each block. Upon comparison, the IR security mark is detected as a tampered security mark.

According to aspects illustrated herein, a multi-function device for detecting tampering of an infrared (IR) security mark in a document is disclosed. The multi-function device is for: receiving a document including the IR security mark, wherein the IR security mark further includes one or more security texts and/or images; scanning the document to generate scanned data; segmenting a portion of the scanned data including the IR security mark into a plurality of blocks; calculating a ratio of white to black pixels for each block; comparing the calculated ratio with a known threshold for each block; and upon comparison, detecting the IR security mark as a tampered security mark.

According to additional aspects illustrated herein, a method for detecting tampering of an infrared (IR) security mark in a document is disclosed. The method includes receiving a document including the IR security mark, wherein the IR security mark further includes one or more security texts and/or images. The document is scanned to generate scanned data in RGB format. The scanned data from RGB format is converted into a binary format. A portion of the scanned data in the binary format including the IR security mark is segmented into a plurality of blocks. A ratio of white to black pixels for each block is calculated. The calculated ratio is compared with a known threshold for each block to classify the block as a tampered block or a non-tampered block. Finally, the number of tampered blocks is compared with the number of non-tampered blocks to confirm whether the IR security mark is tampered or not.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIGS. 4A-4H are exemplary snapshots, in accordance with an embodiment of the present disclosure.

DESCRIPTION

Figure 1:
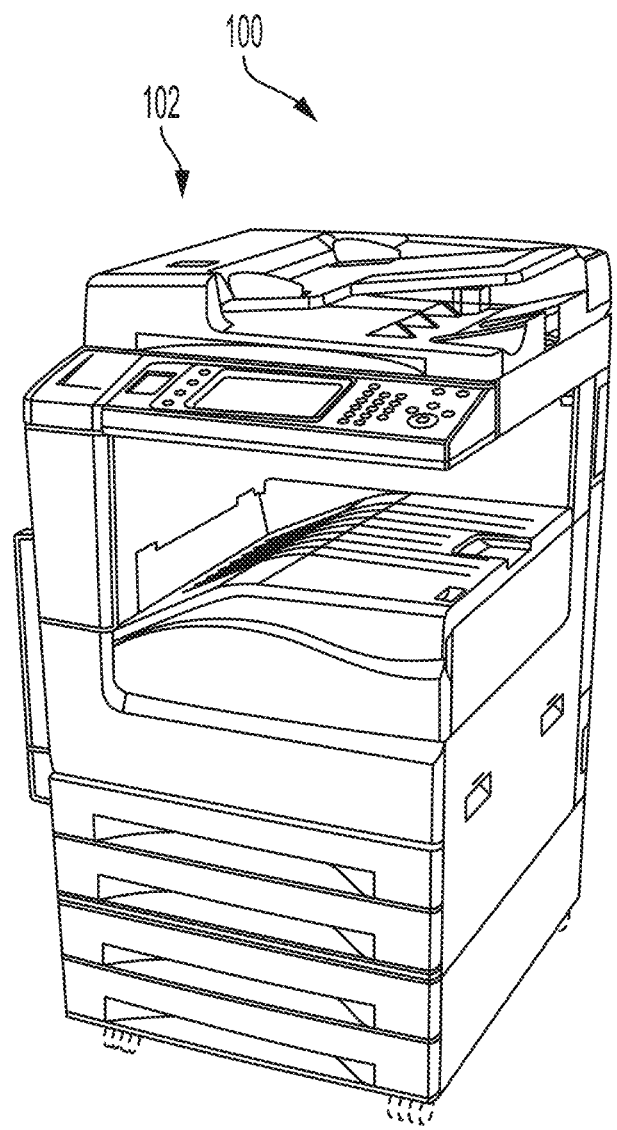
FIG. 1 shows an exemplary environment in which various embodiments of the present disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below. For a person skilled in the art, it is understood that the definitions are provided just for the sake of clarity and are intended to include more examples in addition to the examples provided below.

The term "multi-function device" is a single device or a combination of multiple devices, to perform one or more functions such as, but not limited to, printing, scanning, copying, imaging, or the like. The multi-function device may include software, hardware, firmware, or a combination thereof. In the context of the current disclosure, the multi-function device detects whether an IR security mark included in a document is tampered or not. The tampering is detected at the time of scanning the documents. Specifically, the multi-function device detects tampering of the IR security mark to ensure that the document is not mistakenly classified as a non-confidential, ingenuine, and/or unauthentic document.

The term "document" refers to any document having confidential content or otherwise confidential for individual users, organizations, nations, etc. Various examples of such documents may be, but not limited to, cheques, legal documents, bank bonds, research documents, contract documents, prescriptions, coupons, tickets, invoices, or disclosure documents. Further, the document may include content in the form of texts, images, graphics, or a combination thereof. In context of the current disclosure, the document includes security marks such as IR (Infrared) security marks. The document submitted at the multi-function device is in physical form.

The term "scanned data" refers to raw scanned images generated upon scanning, where no image processing techniques are implemented. The scanned data refers to intermediate scanned images. The term "scanned document" refers to an output generated upon completion of the scanning activity. The scanned document can be referred to as scanned output.

The term "security mark" refers to a mark added/printed/embedded in the document to ensure its authenticity/genuineness/originality/confidentiality. One such example is an IR security mark. The IR security mark refers to a security mark added in the documents to secure the document. The IR security mark includes one or more security texts and/or images which is further covered or hidden by a pattern such that the user cannot see it with naked eyes. The security texts and the pattern collectively refers to the IR security mark. The pattern can be a dot pattern, solid color pattern or the like and can be referred to as a patch/IR patch. Further, the IR security mark may be present on the top right corner, top left corner, bottom left corner, or the bottom right corner of the document.

The term "location information" in the context of the IR security mark refers to information related to the location of the IR security mark in the document submitted for scanning. In other words, the location information indicates the location in the document where the security mark is present or can be present in a confidential document. In the context of the disclosure, the location of the IR security mark is pre-defined and it can be present at either the top right corner, top left corner, bottom right corner, or bottom left corner of the document.

The term "size information" in the context of the IR security mark refers to information related to the size of the IR security mark in the document submitted for scanning. The size of the IR security mark can be 50 mm×10 mm, 70 mm×20 mm, or the like. In one example, the size of the IR security mark is pre-defined/pre-set, i.e., the size of the security mark is pre-configured at the multi-function device/device. The size information can be pre-stored at the multifunction device/device. In another example, if the user is aware, he can input the size information via a user interface. Otherwise, by default, the size information can be retrieved/obtained from the multi-function device/device.

The term "localizing" is used in the context of the IR security mark and it refers to any action or step performed to locate/identify the location of the IR security mark in the document submitted for scanning. In other words, the localization is performed to identify the location of a portion of the document including the IR security mark, specifically, to identify the coordinates of the portion including the IR security mark. The localization is performed based on the location information and the size information associated with the security mark. Once localized, the IR security mark or the portion including the IR security mark is extracted for further processing.

The term "tampering" in the context of the IR security mark refers to altering/damaging of the IR security mark present in the document. The tampering of the IR security mark hinders the accurate recognition of the IR security mark and/or the embedded texts/images, and because of this, the document including the IR security mark may be mistakenly classified as a non-confidential document. Tampering may be caused due to multiple reasons such as crumpling/folding of the document or a portion of the document where the IR security mark is included. In other examples, tampering may be caused due to scribbling over a portion of the document where the IR security mark is present. In an additional example, tampering may be caused due to masking of the IR security mark with paper. These are just few examples, however, there can be any other reasons or user actions that can cause the tampering of the IR security mark.

Overview

The present disclosure discloses methods and systems for detecting tampering of an Infrared (IR) security mark in documents, specifically, scanned documents. The methods and systems detect the tampering of the IR security mark to ensure that the document including the IR security mark is not mistakenly classified as a non-confidential or non-genuine document. Based on the detection and recognition of the IR security mark and/or the embedded information (i.e., security text/images), the document is considered confidential or non-confidential. For instance, if the security mark and/or the embedded information is recognized, the document is classified as genuine, else the document is classified as non-genuine. According to the current disclosure, if the IR security mark is not recognized, the methods and systems detect tampering of the IR security mark in the document and force the classification of the document as confidential/genuine. This way, the methods and systems ensure that the document is not falsely classified as non-confidential and hence ensure accurate detection of the confidentiality/genuineness of the document.

The present disclosure is implemented for scenarios when the IR mark detection fails or symbol (the embedded information) detection in the IR security mark fails. The methods and systems are implemented to detect whether the IR security mark is tampered or not.

Exemplary Environment

FIG. 1 shows an exemplary environment 100 in which various embodiments of the disclosure can be practiced. The environment 100 includes a multi-function device 102 that provides one or more functionalities such as printing, scanning, imaging, copying, and so on. The multi-function device 102 as shown is just one example but the environment 100 may include scanners, or any devices with scanning functionalities. In context of the present disclosure, the multi-function device 102 detects tampering of an Infrared (IR) security mark in documents to ensure that the document is not inadvertently classified as non-confidential/non-genuine.

In general, users/individuals and organizations deal with different documents such as cheques, legal documents, bank bonds, research data, contract documents, prescriptions, coupons, tickets, invoices, disclosure documents, or the like. These documents include different types of content including texts, images, graphics, etc. Further, such documents include different security marks such as barcodes, watermarks, QR codes, or the like, to prevent the documents from any malicious activity, such as counterfeiting, duplication, etc. In the context of the disclosure, the document includes one or more IR security marks.

The IR security mark includes one or more security texts and/or images which is further covered or hidden by a pattern such that the user cannot see it with naked eyes. The pattern can be a dot pattern, solid color pattern or the like and can be referred to as a patch/IR patch. The security texts and the pattern collectively, refer to the IR security mark. Further, the embedded text may include alphabets, numbers, special characters, or a combination thereof. The embedded text/security text may represent a name of an organization associated with the document, for example, a college or university name. In another example, the embedded text may be a text/phrase to indicate the confidentiality of the document. Some exemplary embedded text include, "confidential", "secure", "protected", "confidential and privileged" and so on.

In implementation, a user submits a document including an IR security mark at the multi-function device 102. Upon receiving the document, the multi-function device 102 localizes the IR security mark based on location information and size information associated with the security mark. Once localized, the multi-function device 102 extracts the security text embedded in the IR security mark and recognizes the security text. Here, if the security text is recognized, the multi-function device 102 classifies the document as genuine. In context of the current disclosure, if the security text is not recognized, the multi-function device 102 proceeds forward. The multi-function device 102 obtains a binary image of the IR security mark, i.e., the localized IR security mark and segments the localized security mark into multiple blocks such as blocks of size 32*32. The multi-function device 102 then calculates a ratio of white to black pixels for each block and compares it with a threshold value, and accordingly determines the tampering of the IR security mark. For example, if the ratio significantly varies in a reasonable number of blocks, then the multi-function device 102 considers/verifies that the IR security mark is tampered. Once the tampering of the security mark is detected, the multi-function device 102 forces the classification of the document to confidential, logs a malicious activity, and notifies an admin user and/or one or more other users. More implementation and structural details will be discussed below in conjunction with FIG. 2.

Exemplary System

Figure 2:
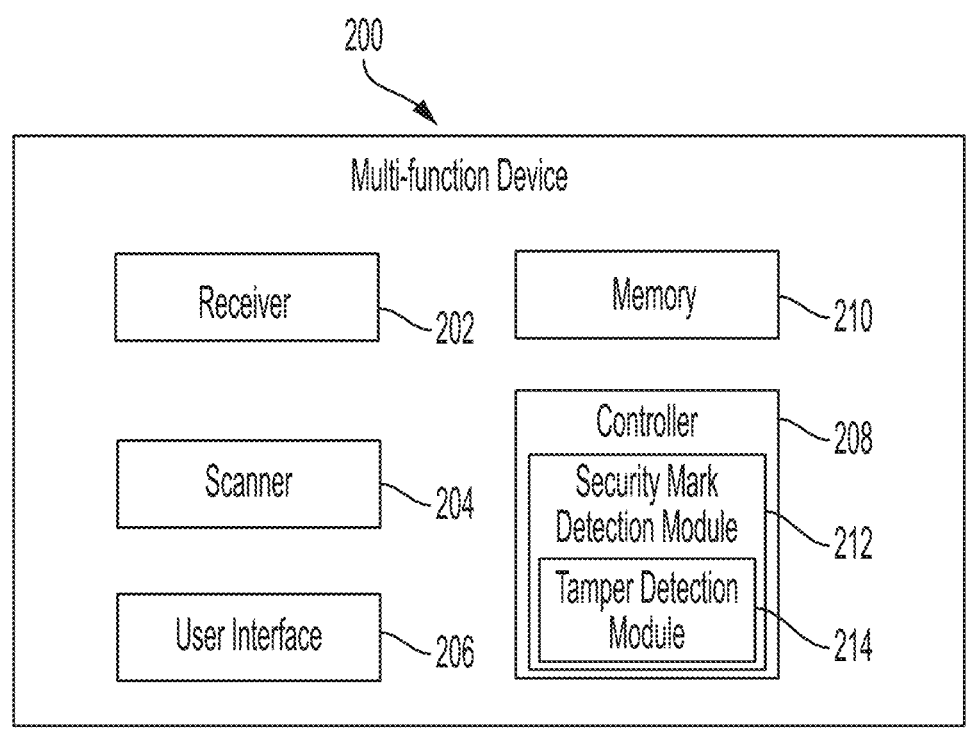
FIG. 2 is a block diagram illustrating various components of a multi-function device, in accordance with an embodiment of the present disclosure.

FIG. 2 is a block diagram illustrating various components of a multi-function device 200 for implementing the current disclosure. As shown, the multi-function device 200 includes a receiver 202, a scanner 204, a user interface 206, a controller 208, and a memory 210. The controller 208 includes a security mark detection module 212, which further includes a tamper detection module 214. The components 202-214 are connected to each other via a conventional bus or a later developed protocol. And the components 202-214 communicate with each other for performing various functions of the present disclosure. The multi-function device 200 may further include additional component(s) as required to implement the present disclosure.

Initially, a user submits a document at the multi-function device 200. The document includes content in the form of text, images, graphics, or a combination thereof. The document further includes one or more infrared (IR) security marks and the document can be a single page or can be a multi-page document having an IR security mark on one or more pages of the document. The document may include confidential content or may be otherwise confidential to the user and/or to an organization.

Figure 3A:
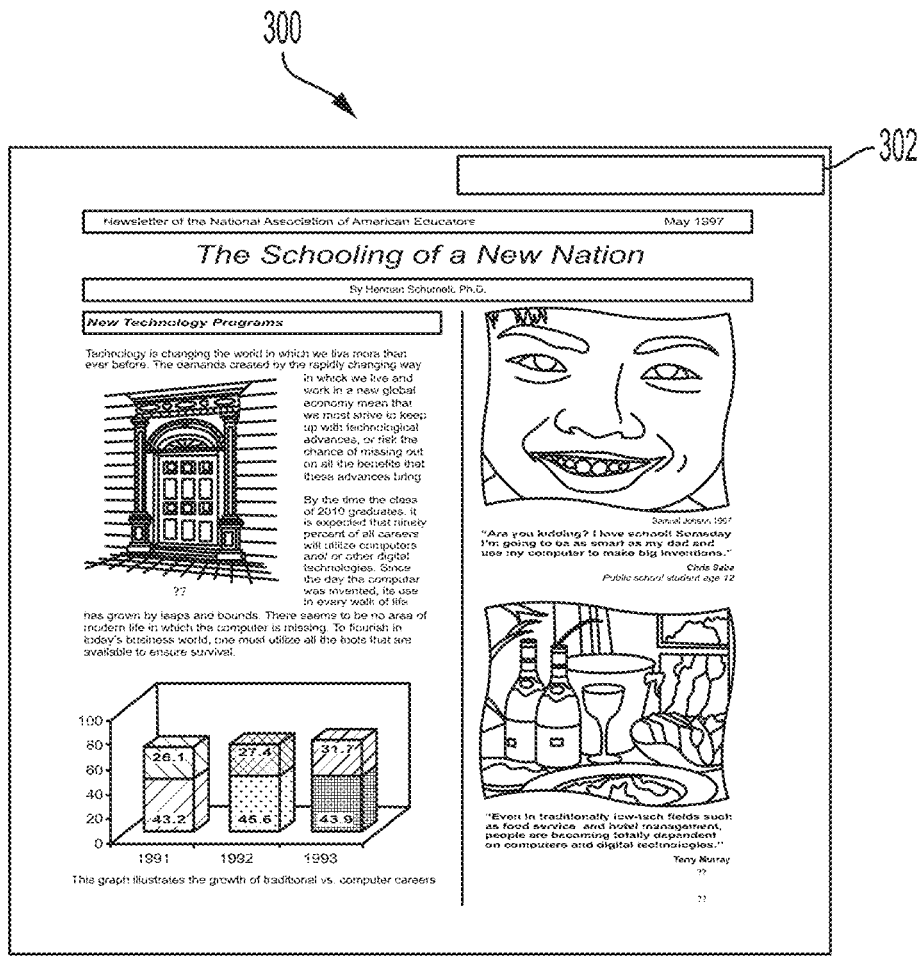
FIGS. 3A-3E are exemplary snapshots, in accordance with an embodiment of the present disclosure.

Further, the IR security mark includes one or more security texts and/or images which is further covered or hidden by a pattern such that the user cannot see it with naked eyes. For easy discussion, the disclosure is discussed with respect to a text-based security mark, i.e., the security mark includes one or more texts/security texts. However, the disclosure can be implemented for an image-based IR security mark. The IR security mark may be present anywhere in the document such as the top right corner, bottom right corner, top left corner, or bottom left corner. One such exemplary snapshot of a document such as 300 is shown in FIG. 3A. As illustrated, the document 300 includes content such as text, images, etc. The document 300 further includes an IR security mark 302 including the security text/images (although not visible).

The user submits the document at the multi-function device 200, specifically, the user places the document at the receiver 202 such as a platen or automatic document handler (ADH). After submitting, the user accesses the user interface 206 of the multi-function device 200. The user interface 206 displays multiple options such as scan, print, workflow, copy, fax, and so on. In context of the current disclosure, the user interface 206 displays a new option "security mark detection workflow". The option allows the user to detect whether the IR security mark is present in the submitted document and specifically, the option allows the user to detect whether the IR security mark is tampered or not, if the IR security mark is not detected. The selection of the option is received by the controller 208. Once received, the controller 208 triggers the scanner 204 to scan the document.

Thereafter, the scanner 204 scans the document and generates scanned data. The scanner 204 generates the scanned data in any desired color space/format for further processing. One such desired color space format is RGB (Red-Green-Blue) color space. The controller 208 sends the scanned data in the RGB color space to the security mark detection module 212 for further processing.

Once received, the security mark detection module 212 localizes the IR security mark, i.e., the security mark detection module 212 analyzes the scanned data to identify the location of the IR security mark in the scanned data. To this end, the security mark detection module 212 converts the received scanned data/image from the RGB color space to a LAB color space (CIELAB color space). In LAB color space, each color value is expressed in three values, L* for perceptual lightness, and a* and b* for the four unique colors, i.e., red, green, blue, and yellow. Then, the security mark detection module 212 performs the blurring operation using a kernel of a suitable size. In one example, the blurring is performed using a blur kernel of size 3*3.

Figure 3B:
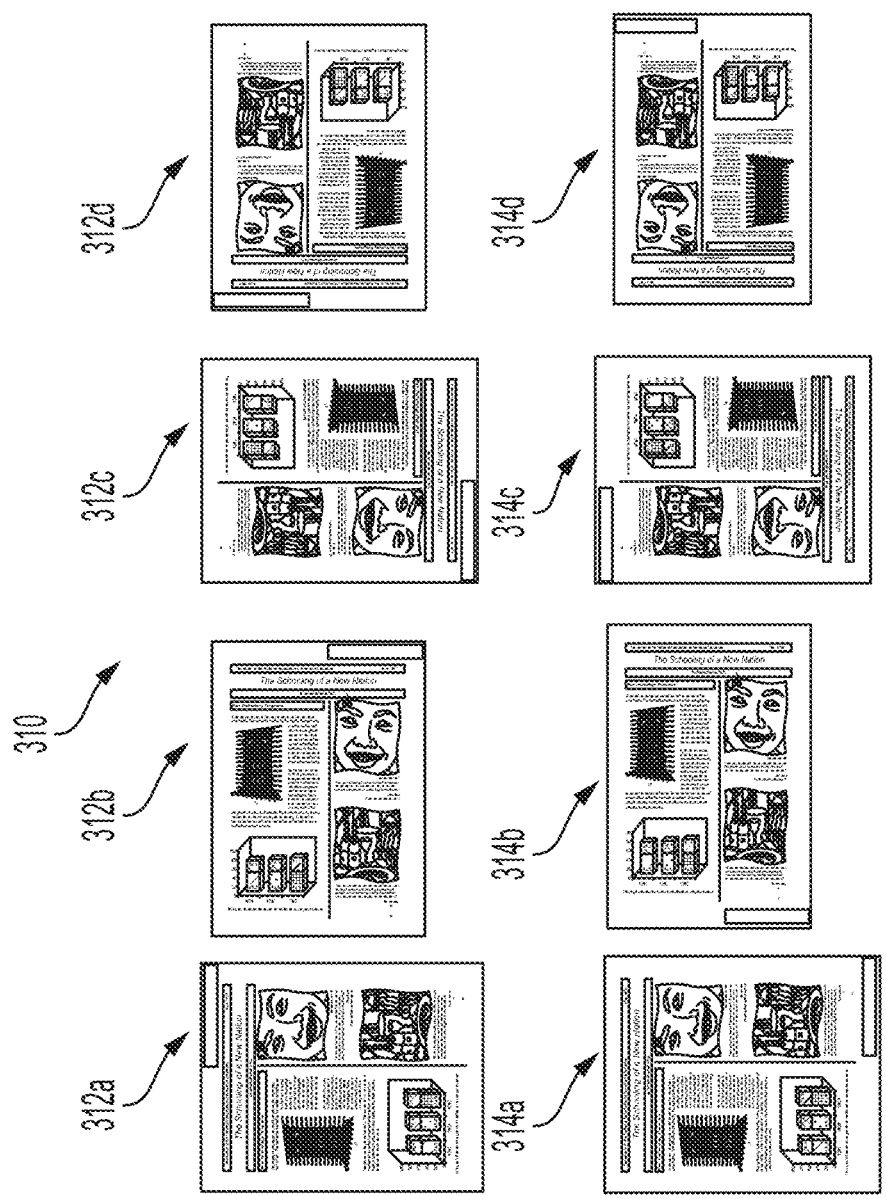
Figure 3C:
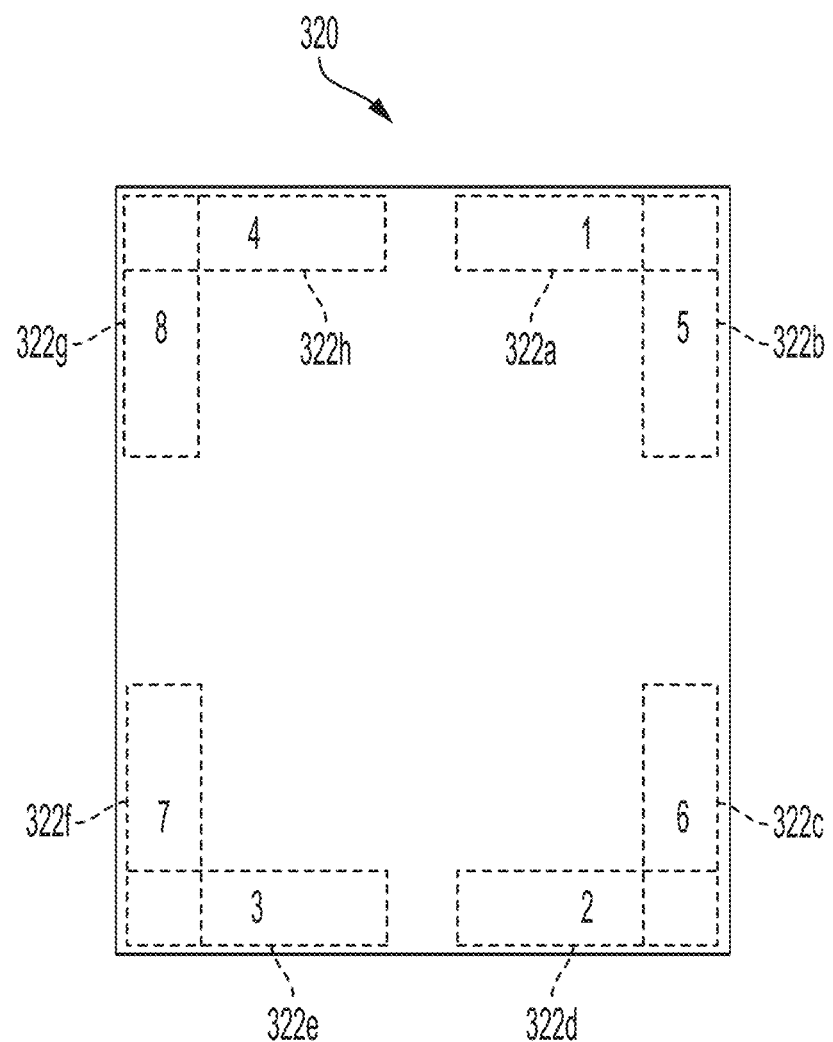

Thereafter, the security mark detection module 212 divides the scanned data into 8 regions of interest (ROI) and further extracts those 8 ROIs. The ROI represents a region where the IR security mark can be present. Here, it is known that the security mark can be present on either the top right corner, bottom right corner, top left corner, or bottom left corner of the document. Further, at the time of submitting the document at the multi-function device 200, the user can feed the document in four possible directions, i.e., 2 possible directions/positions in landscape mode and 2 possible directions/positions in portrait mode. Thus, the security mark can be present at eight possible locations in the document. FIG. 3B illustrates a snapshot 310 showing eight possible locations/ROIs, where the IR security mark can be present in the document, based on the feed direction. Specifically, the snapshot 310 showcases eight possible locations of the security mark based on the feed directions, i.e., based on the direction in which the user can place the document at the multi-function device 200. The user can place the document in any direction at the multi-function device 200. Accordingly, four possible locations where the IR security mark can be present are shown as 312a, 312b, 312c, or 312d when the IR security mark is present on the top right corner of the submitted document. Similarly, four possible locations where the IR security mark can be present are shown as 314a, 314b, 314c, or 314d when the IR security mark is present on the bottom right corner of the submitted document. Even, if the security mark is present at the top left corner or the bottom left corner, then also there are eight possible locations in the document where the IR security mark can be found, based on a feeding direction of the document such as landscape mode or portrait mode. Here, the eight possible locations, where the IR security mark is present when the security mark is on the top left corner or bottom left corner, will coincide with eight possible locations of the security mark when the security mark is present on the top right corner or the bottom right corner. Thus, the IR security mark can be present at eight possible locations in the document. FIG. 3C illustrates a snapshot 320 with 8 possible locations of the IR security mark in the scanned data such as 322a, 332b, 322c, 322d, 322e, 322f, 322g, and 322h. The locations can be referred to as regions of interest, wherein the IR security mark can be present.

Figure 3D:
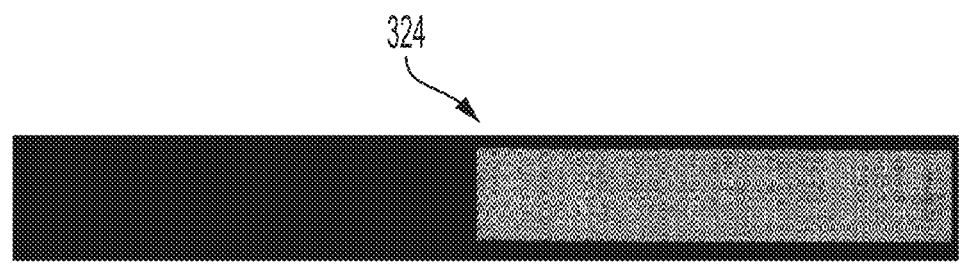
Figure 3E:
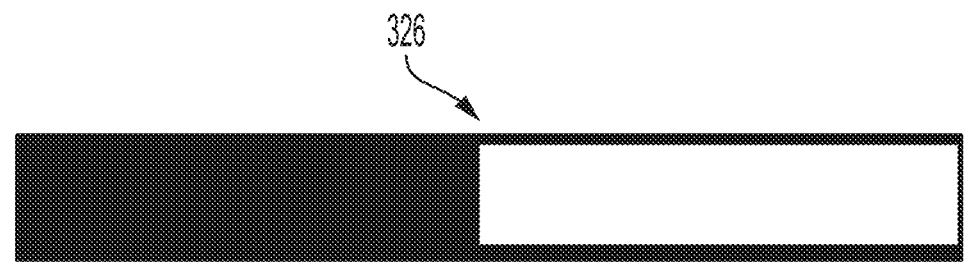

Once all 8 regions of interest/locations are identified, the 8 regions of interest are extracted from the scanned data. The security mark detection module 212 then identifies which region of interest includes the IR security mark. To this end, the security mark detection module 212 obtains a binary image for all 8 regions of interest. For each region, the security mark detection module 212 calculates average pixel values in the LAB channel and compares them against a threshold value, and obtains the binary image. FIG. 3D illustrates an exemplary snapshot 324 of a binary image obtained after the conversion. Once the binary image is obtained, the security mark detection module 212 performs a morphological operation to solidify the IR security mark. Any known or later developed morphological operations can be performed to solidify the IR security mark. FIG. 3E illustrates an exemplary snapshot 326 of the extracted region obtained after performing the morphological operation.

Thereafter, the security mark detection module 212 determines the size of the solidified patch and compares the determined size with a known/reference size information. Here, the reference size information can be pre-defined, i.e., the reference size information is pre-defined and pre-stored in the memory 210 of the multi-function device 200. In one example, the size information is provided by the user. In such scenario, the user provides the size information while submitting the document. Based on the comparison, the security mark detection module 212 identifies the presence of the security mark in the regions of interest. For example, if the size of the solidified patch matches the known/reference size information, then the region of interest including the solidified patch is identified as the region of interest including the security mark. This operation is performed for each region of interest, i.e., 8 regions. This way, the security mark detection module 212 identifies the region of interest that includes the IR security mark and the location of the security mark in the region of interest. Once identified, the security mark detection module 212 identifies the coordinates of the IR security mark in the scanned document.

Then, the security mark detection module 212 detects and extracts the security text embedded in the IR security mark, and identifies the security text. There can be situations when the security mark detection module 212 does not identify or recognize the security text due to one or more reasons discussed above, in such cases, the present disclosure is implemented.

In context of the present disclosure, if the security mark detection module 212 does not detect the security text embedded/included in the IR security mark, the IR security mark detection module 212 proceeds with the tamper detection process. The security mark detection module 212 triggers the tamper detection module 214.

Once triggered, the tamper detection module 214 obtains the binary image of the IR security mark, i.e., a portion of the scanned data that includes the IR security mark obtained after the localization. The tamper detection module 214 divides the IR security mark (i.e., binary image of the security mark) into multiple blocks of size 32*32. Here, the IR security mark is in pixel format. Then, for each block, the tamper detection module 214 calculates the number of white pixels and black pixels, and thereafter a ratio of white to black pixels for each block is calculated. Once calculated, the tamper detection module 214 compares the calculated ratio with a pre-determined/known threshold value. The pre-determined threshold value is pre-stored at the multi-function device 200, which may be calculated based on the analysis of different non-tampered IR security marks, i.e., based on the ratio of white pixels and black pixels in non-tampered security marks. Further, the threshold value may be calculated based on the analysis of different tampered security marks. In some implementations, the pre-determined threshold value may depend upon a scan resolution of the multi-function device 200. For instance, a pre-determined threshold value may be 15 when the scan resolution is 200 DPI (Dots Per Inch), in other instances, the pre-determined threshold may be 20 if the scan resolution is 300 DPI. The tamper detection module 214 compares the calculated ratio with the pre-determined threshold value to classify a block as a tampered block or non-tampered block. For example, upon comparison, if the calculated ratio and the pre-determined threshold value are significantly different, then the block is classified as a tampered block. Otherwise, the tamper detection module 214 classifies the block as a non-tampered block. In another example, if the calculated ratio is less than the pre-determined threshold value, the tamper detection module 214 classifies the block as a non-tampered block. Similarly, the tamper detection module 214 classifies each block as tampered block or non-tampered block.

Once all the blocks are classified, the tamper detection module 214 counts the number of tampered blocks and the number of non-tampered blocks and compares the number of tampered blocks and the non-tampered blocks. Based on the comparison, the tamper detection module 214 identifies and/or classifies the IR security mark as tampered. For instance, if the number of tampered blocks is more than the number of non-tampered blocks, the tamper detection module 214 classifies the IR security mark as tampered. Further, the tamper detection module 214 may classify the IR security mark as tampered, if the number of tampered blocks is significant, for example, if the number of tampered blocks is more than 20% of the total number of the blocks.

After successful tamper detection, the tamper detection module 214 logs the document as tampered and communicates the same to the controller 208. The controller 208 then forces the classification of the document as confidential and/or authentic. The controller 208 further notifies an admin user about the tampering of the IR security mark. This way, the multi-function device 200 detects tampering of the IR security mark.

Continuing with FIG. 2 description, the user interface 206 displays various options to the user such as scan, print, tamper detection workflow, etc. The user interface 206 further receives input from the user. The user interface 206 further displays a notification to the user and/or the admin user.

The memory 210 stores all relevant information required for implementing the current disclosure. For example, the memory 210 temporarily stores size information related to the IR security mark, which is pre-defined or obtained from the user. The memory 210 may also store the pre-determined threshold value related to the IR security mark. Further, the memory 210 maintains a repository of different infrared security marks and information related to it. The information includes embedded security text/images. Any details stored in the memory 210 may be retrieved by the controller 208, the security mark detection module 212, the tamper detection module 214, or other components for implementing the current disclosure.

Exemplary Snapshots

Figure 4A:
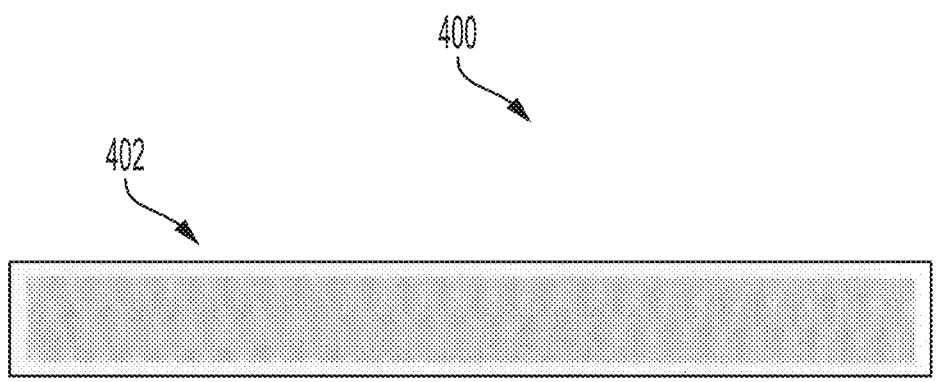
Figure 4B:
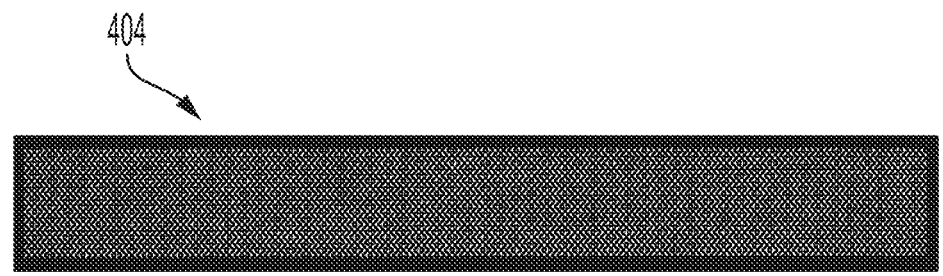

FIG. 4A is a snapshot 400 illustrating an exemplary IR security mark 402 including security text/images, although not visible. The IR security mark 402 represents a non-tampered IR security mark. The IR security mark 402 as shown is extracted from a document. A binary image such as 404 of the IR security mark 402 is shown in FIG. 4B after performing binary conversion operation on the IR security mark 402.

FIG. 4C is an exemplary snapshot 406 illustrating an IR security mark 408 masked with paper 409. After performing the binary conversion operation on the IR security mark 408, a binary image 410 of the IR security mark 408 as obtained is shown in FIG. 4D. The binary image 410 is segmented into multiple blocks of size 32*32. Some exemplary blocks are shown as 412a, 412b, 412c (collectively blocks 412), 414a, 414b, and 414c (collectively 414). As illustrated in blocks 412, a ratio of white to black pixels is consistent that indicates that the blocks 412 are non-tampered. For each block 414, the ratio of white to black pixels is not consistent that indicates that the blocks 414 are tampered.

Figure 4E:
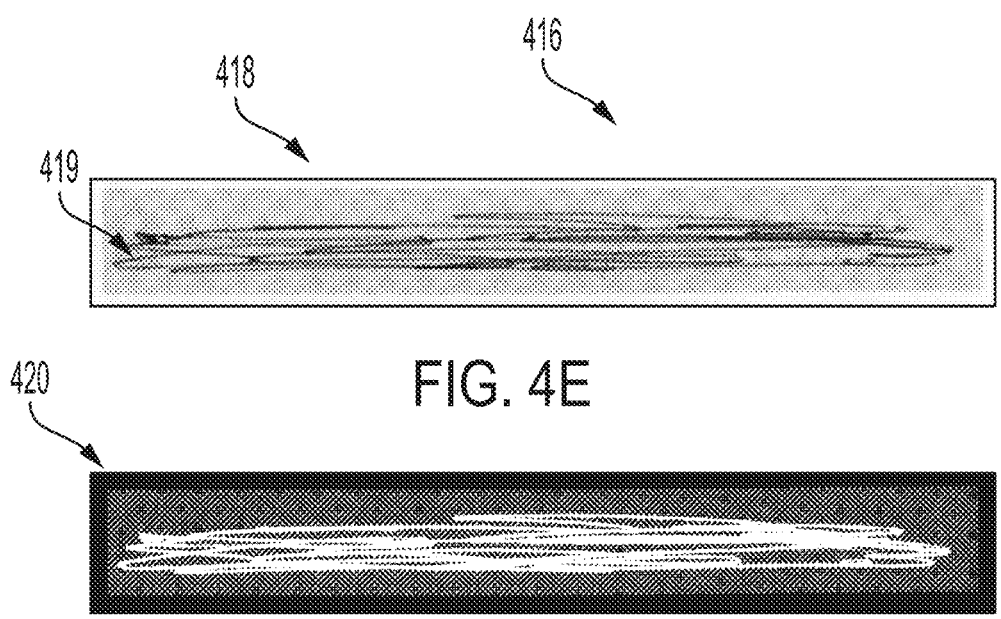
Figure 4F:

FIG. 4E is an exemplary snapshot 416 illustrating an IR security mark 418 including scribblings 419. The IR security mark 418 with scribbling 419 indicates a tampered IR security mark 418. After performing the binary conversion operation on the IR security mark 418, a binary image 420 of the IR security mark 418 as obtained is shown in FIG. 4F. The binary image 420 is segmented into multiple blocks such as 422a 422b, 422c, 424a, 424b, 424c of size 32*32. Some exemplary blocks are shown as 422a, 422b, 422c (collectively blocks 422), 424a, 424b, and 424c (collectively 424). As illustrated, in blocks 422, a ratio of white to black pixels is consistent indicating that the blocks 422 are non-tampered. For each block 424, the ratio of white to black pixels is not consistent that may indicate that the blocks 424 are tampered.

Figure 4G:
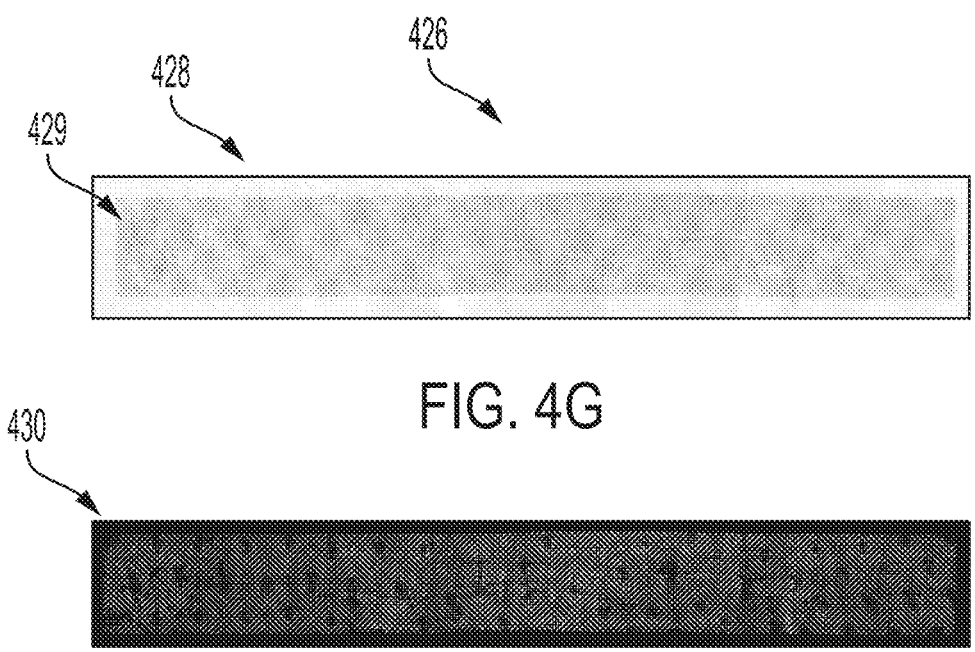
Figure 4H:

FIG. 4G is an exemplary snapshot 426 illustrating an IR security mark 428. As shown, the IR security mark 428 is crumpled (shown via 429). After performing the binary conversion operation on the IR security mark 428, a binary image 430 of the IR security mark 428 as obtained is shown in FIG. 4H. The binary image 430 is segmented into multiple blocks such as 432a 432b, 432c, 434a, 434b, 434c of size 32*32. Some exemplary blocks are shown as 432a, 432b, 432c (collectively blocks 432), 434a, 434b, and 434c (collectively 434). As illustrated, in each block 432, a ratio of white to black pixels is consistent indicating that the blocks 432 are non-tampered. For each block 434, a ratio of white to black pixels is not consistent which may indicate that the blocks 434 are tampered. In blocks 434, the ratio significantly varies, as a result, the blocks 434 can be classified as tampered blocks.

Exemplary Flowchart

Figure 5A:
FIGS. 5A and 5B illustrate a method flowchart for detecting tampering of an infrared (IR) security mark in documents, in accordance with an embodiment of the present disclosure.
Figure 5B:
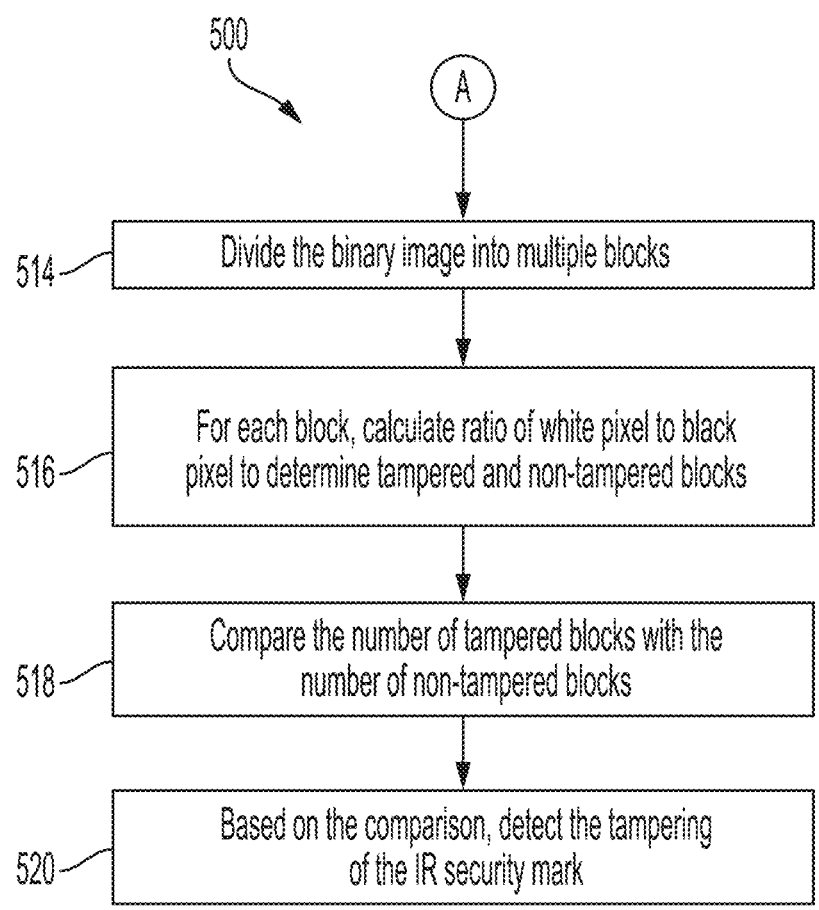

FIGS. 5A-5B represent a method 500 for detecting tampering of infrared (IR) security marks in documents, specifically, scanned documents. The method 500 may be implemented at a multi-function device, such as the multi-function device 102 of FIG. 1, the multi-function device 200 of FIG. 2. However, the method 500 can be implemented at any equivalent device with scanning functionality, and so on.

The method 500 begins when a user wishes to identify whether a document is a confidential document or whether the document is an original document.

To this end, the user submits the document at the multi-function device. The document includes confidential content, such as text, image, signature, etc., and one or more IR security marks.

The IR security mark includes one or more security texts and/or images which is further covered or hidden by a pattern such that the user cannot see it with naked eyes. The pattern can be dot pattern, solid color pattern or the like and can be referred to as patch/IR patch. The security texts and the pattern collectively, refers to the IR security mark. For easy discussion, the disclosure is discussed with respect to a text-based security mark, i.e., the security mark includes one or more texts/security texts. The security text is embedded/included within an IR security mark. Moreover, the IR security mark may be present at the top right corner, bottom right corner, top left corner, or bottom left corner of the document. The document submitted is in the physical form.

At 502, the document including the IR security mark is received. The security mark includes the security text embedded within the IR security mark. After this, the user initiates processing by selecting a pre-defined option such as "security mark detection workflow" option via a user interface.

Once initiated, at block 504, the document is scanned to generate scanned data, where the scanned data is generated in any desired color space/format for further processing. One such color space of the scanned data is RGB (Red-Green-Blue) color space.

Then, at block 506, the scanned data is analyzed to localize the IR security mark. In the scanned data, depending on the feed direction and location of the IR security mark in the document, there are eight possible locations (ROIs) where the IR security mark can be present. In detail, first, the scanned data from the RGB color space is converted to a LAB color space (CIELAB color space). Once converted, a blurring operation is performed. Thereafter, the scanned data is divided and 8 regions of interest (ROI) that may include the IR security mark are extracted. After extracting the regions of interest, the presence of the IR security mark is detected in the extracted regions. To this end, a binary image for the extracted regions of interest is obtained. Then, a morphological operation is performed to solidify the region. The size of the solidified patch is determined, and the determined size is compared with a reference/known size information. The reference size information can be pre-defined, i.e., the reference size information is pre-defined and pre-stored. In one example, the size information is provided by the user. In such scenario, the user provides the size information while submitting the document. Based on the comparison, the presence of the IR security mark in the segmented region is identified. This operation is performed for each region of interest, i.e., 8 regions. This way, the region of interest including the IR security mark and the location of the security mark in the region of interest is identified. Then, the coordinates of the IR security mark in the scanned data, i.e., the exact location where the security mark is present in the scanned data is determined.

Thereafter, at 508, the security/secure text is extracted from the IR security mark. The extraction of the security text is performed using any known or later developed methods.

Post extraction, at 510, the security/secure text is validated. Upon unsuccessful validation, the method 500 proceeds forward. At block 512, a binary image of the IR security mark is considered for further processing.

Thereafter, at block 514, the binary image of the IR security mark is divided/segmented into multiple blocks of size 32*32. At 516, the number of white pixels and the number of black pixels is calculated for each block. Based on the calculation, a ratio of white to black pixels is calculated for each block to determine/identify the tampered and non-tampered blocks. The calculated ratio is compared with a known threshold for each block. Based on the comparison, each block is classified as a tampered block or non-tampered block.

Thereafter, at 518, the number of tampered blocks is compared with the number of non-tampered blocks. Finally, at 520, based on the comparison, tampering of the IR security mark is detected. For example, if the number of tampered blocks is more than the number of non-tampered blocks, the IR security mark is considered as tampered. Then, an admin user is notified about the tampered IR security mark. Finally, the document is classified as a confidential document. In one example, if the number of tampered blocks is less than the number of non-tampered blocks, the IR security mark is considered as non-tampered.

The present disclosure discloses methods and systems for detecting tampering of an Infrared (IR) security mark in scanned documents. Specifically, the methods and systems allow a multi-function device to detect the tampering of the security mark to ensure that the document including the security mark is not inadvertently classified as non-confidential. This way, the methods and systems allow accurate identification of the authenticity of the document even if the IR security mark is tampered. The methods and systems propose a simple way to detect whether the IR security mark is tampered, and thus less computational complexity is involved. The systems help to identify tampered IR security marks and further enhance the security.

The methods and systems rely on a more detailed examination of the pixels within sub-sections (blocks) of a detected IR security mark to determine if the ratio of black to white pixels within a pre-defined number of the defined blocks of size 32*32 varies from a set threshold. And thus indicates tampering of the IR security mark (whether intentional or unintentional). The methods and systems notify an admin user of malicious activity. The current solution offers a simple method to enhance document security using IR security marks.

The methods and systems localize the IR security mark from scanned data using known possible locations and known size.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as receiving, scanning, identifying, classifying, detecting, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for detecting a tampered infrared (IR) security mark in documents, the method comprising:
   receiving a document comprising the IR security mark, wherein the IR security mark further comprises one or more security texts and/or images;
   scanning the document to generate scanned data;
   segmenting a portion of the scanned data comprising the IR security mark into a plurality of blocks;
   calculating a ratio of white to black pixels for each block;
   comparing the calculated ratio with a known threshold for each block; and
   upon comparison, detecting the IR security mark as a tampered security mark.

2. The method of claim 1, further comprising, classifying the document as a confidential document upon detecting whether the IR security mark is a tampered IR security mark.

3. The method of claim 1, further comprising, calculating a number of white to black pixels for each block.

4. The method of claim 1, further comprising, classifying a block as a tampered block based on the comparison of the ratio of white to black pixels with the known threshold.

5. The method of claim 4, further comprising, classifying a block as a non-tampered block based on the comparison of the ratio of white to black pixels with the known threshold.

6. The method of claim 5, further comprising, comparing the number of tampered blocks with the number of non-tampered blocks to identify whether the IR security mark is a tampered security mark.

7. The method of claim 1, wherein the plurality of blocks is of size 32*32.

8. The method of claim 1, further comprising, localizing the portion of the scanned data comprising the IR security mark based on at least one of: location information and size information of the IR security mark.

9. The method of claim 1, further comprising, notifying an admin user about the tampered IR security mark.

10. The method of claim 1, further comprising, classifying a block as a tampered block if the ratio of white pixels to black pixels varies in a pre-defined number of blocks.

11. A multi-function device for detecting tampering of an infrared (IR) security mark in a document, the multi-function device is for:
    receiving a document comprising the IR security mark, wherein the IR security mark further comprises one or more security texts and/or images;
    scanning the document to generate scanned data;
    segmenting a portion of the scanned data comprising the IR security mark into a plurality of blocks;
    calculating a ratio of white to black pixels for each block;
    comparing the calculated ratio with a known threshold for each block; and
    upon comparison, detecting the IR security mark as a tampered security mark.

12. The multi-function device of claim 11, further classifies the document as a confidential document upon detecting whether the IR security mark is a tampered security mark.

13. The multi-function device of claim 11, further calculates a number of white to black pixels for each block.

14. The multi-function device of claim 11, further classifies a block as a tampered block based on the comparison of the ratio of white to black pixels with the known threshold.

15. The multi-function device of claim 14, further classifies a block as a non-tampered block based on the comparison of the ratio of white to black pixels with the known threshold.

16. The multi-function device of claim 15, further compares the number of tampered blocks with the number of non-tampered blocks to identify whether the IR security mark is a tampered security mark.

17. A method for detecting tampering of an infrared (IR) security mark in a document, the method comprising:
- receiving a document comprising the IR security mark, wherein the IR security mark further comprises one or more security texts and/or images;
- scanning the document to generate scanned data in a RGB format;
- converting the scanned data from the RGB format to a binary format;
- segmenting a portion of the scanned data in the binary format, comprising the IR security mark into a plurality of blocks;
- calculating a ratio of white to black pixels for each block;
- comparing the calculated ratio with a known threshold for each block to classify the block either as a tampered block or a non-tampered block; and
- comparing the number of tampered blocks with the number of non-tampered blocks to confirm whether the IR security mark is tampered or not.

18. The method of claim 17, further comprising, classifying the document as a confidential document upon detecting whether the IR security mark is a tampered security mark.

19. The method of claim 17, further comprising, receiving size information of the IR security mark.

20. The method of claim 17, further comprising, localizing the portion of the scanned data in the binary format comprising the IR security mark based on location information and size information of the IR security mark.

* * * * *